(12) United States Patent
Lawrence

(10) Patent No.: US 7,874,319 B2
(45) Date of Patent: Jan. 25, 2011

(54) TUBE FOR GUIDING GAS OR LIQUID

(75) Inventor: Ian Lawrence, Exter (GB)

(73) Assignee: Mahle Filtersysteme GmbH, Stuttgart (DE)

( * ) Notice: Subject to any disclaimer, the term of this patent is extended or adjusted under 35 U.S.C. 154(b) by 1224 days.

(21) Appl. No.: 10/565,344

(22) PCT Filed: Jul. 15, 2004

(86) PCT No.: PCT/DE2004/001544

§ 371 (c)(1),
(2), (4) Date: Jan. 20, 2006

(87) PCT Pub. No.: WO2005/015070

PCT Pub. Date: Feb. 17, 2005

(65) Prior Publication Data

US 2007/0113912 A1  May 24, 2007

(30) Foreign Application Priority Data

Aug. 5, 2003  (DE) ................. 103 36 622

(51) Int. Cl.
*F16L 11/00* (2006.01)
(52) U.S. Cl. ............... 138/121; 138/119; 138/109
(58) Field of Classification Search ............ 138/121, 138/119, 109
See application file for complete search history.

(56) References Cited

U.S. PATENT DOCUMENTS

| | | | | |
|---|---|---|---|---|
| 1,022,943 A | * | 4/1912 | Hinsky | 138/124 |
| 2,968,321 A | * | 1/1961 | Kahn | 138/122 |
| 3,109,461 A | | 11/1963 | Wolff et al. | |
| 4,090,487 A | * | 5/1978 | Stumpp et al. | 123/453 |
| 4,172,473 A | * | 10/1979 | Lefere et al. | 138/120 |
| 4,661,396 A | * | 4/1987 | Andorf et al. | 428/217 |
| 5,325,845 A | * | 7/1994 | Adair | 600/114 |
| 5,439,035 A | | 8/1995 | Dal Palu | |
| 5,678,610 A | * | 10/1997 | Scarazzo et al. | 138/109 |
| 5,927,344 A | * | 7/1999 | Nobileau | 138/114 |
| 5,975,144 A | | 11/1999 | Akedo et al. | |
| 6,012,494 A | * | 1/2000 | Balazs | 138/119 |

(Continued)

FOREIGN PATENT DOCUMENTS

DE  7403631  2/1974

(Continued)

OTHER PUBLICATIONS

International Search Report, Oct. 2004.

*Primary Examiner*—James F Hook
(74) *Attorney, Agent, or Firm*—Collard & Roe, P.C.

(57) ABSTRACT

The invention relates to a tube (1) for guiding gas and/or liquid, particularly on an internal combustion engine, comprising a supporting body (2) and a skin (3). The supporting body (2) consists of a relatively stiff first plastic and has a number o recesses (6), which pass through the supporting body (2) and are arranged in such a manner that the supporting body (2) is flexible in a longitudinal section provided with the recesses (6) and resists pressure forces. The skin (3) consists of a relatively supple second plastic and is placed on the supporting body (2) in such a manner as to close the recesses (6) in a tight manner and transfers pressure forces acting thereupon to the supporting body (2).

12 Claims, 3 Drawing Sheets

U.S. PATENT DOCUMENTS

Figure 1:
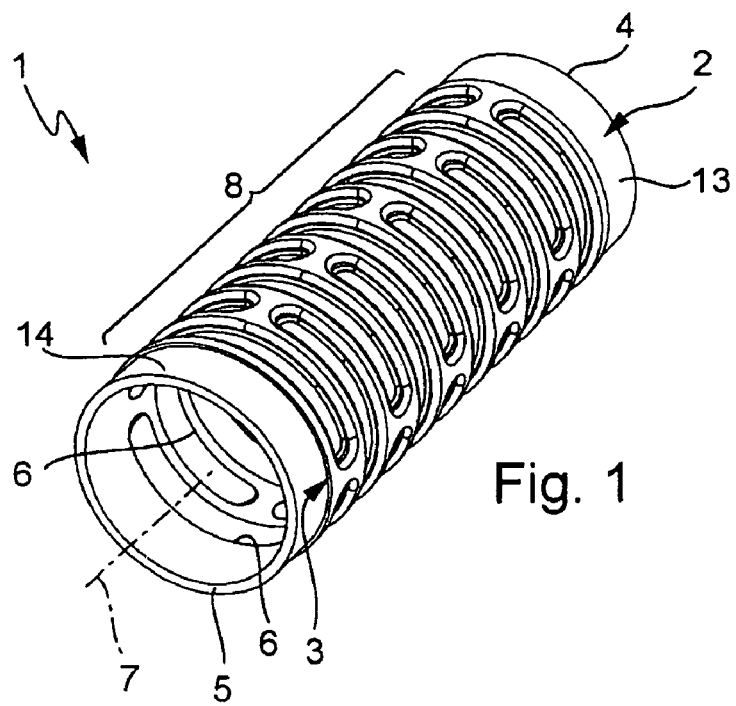

| | | | |
|---|---|---|---|
| 6,116,288 A * | 9/2000 | Yamamura | 138/118 |
| 6,186,183 B1 | 2/2001 | Lepoutre | |
| 6,494,496 B1 | 12/2002 | Sweeney | |
| 2003/0079790 A1 | 5/2003 | Atkinson et al. | |
| 2007/0039659 A1 * | 2/2007 | Coel et al. | 138/173 |

FOREIGN PATENT DOCUMENTS

| | | |
|---|---|---|
| DE | 7131539 | 6/1974 |
| DE | 7131539 U | 6/1974 |
| DE | 2943699 | 5/1981 |
| DE | 29710258 | 6/1997 |
| EP | 0465837 | 1/1992 |
| EP | 0805299 | 11/1997 |
| GB | 2122714 | 1/1984 |
| JP | 10-160062 | 6/1998 |
| JP | 10227379 | 8/1998 |
| JP | 2001-241574 | 9/2001 |
| WO | WO01/29474 | 4/2001 |

* cited by examiner

US 7,874,319 B2

TUBE FOR GUIDING GAS OR LIQUID

CROSS REFERENCE TO RELATED APPLICATIONS

Applicant claims priority under 35 U.S.C. §119 of German Application No.103 36 622.9 filed Aug. 5, 2003. Applicant also claims priority under 35 U.S.C. §365 of PCT/DE2004/001544 filed Jul. 15, 2004. The international application under PCT article 21(2) was not published in English.

The present invention relates to a pipe for carrying gas and/or liquid, in particular to an internal combustion engine.

In many technical applications, it is necessary to convey a gas or a liquid from a first component to a second component. In an internal combustion engine in particular, at least when it is installed in a motor vehicle, relative movements that may occur during operation, e.g., vibration, oscillation and thermal expansion effects, between the components that are interconnected with the help of the pipe. The pipe must be designed to be flexible accordingly in order to prevent this from destroying the pipe. For example, the pipe may be designed as corrugated tubing or bellows to have the required flexibility. Particular problems also arise when the pipe must also be pressure-resistant, i.e., when a pressure difference prevails between the inside of the pipe and the outside of the pipe. The result here is a coincidence of material requirements that are in mutual opposition because the stiffest possible material is required for it to be pressure-resistant, whereas the most flexible possible material is required to achieve the desired flexibility.

To produce such bellows, comparatively expensive rubber-like materials are thus needed, so that pipes of this type are comparatively expensive.

The present invention relates to the problem of providing an improved embodiment of the pipe of the type defined in the preamble so that it can be manufactured especially inexpensively.

This problem is solved according to the present invention through the objects of the independent claims. Advantageous embodiments are the object of the dependent claims.

The present invention is based on the general idea of constructing the pipe of two interconnected bodies, namely a supporting body and a membrane, whereby the supporting body per se is made of an essentially stiff first plastic, but it is shaped so that the supporting body has the desired flexibility and the membrane adequately seals the supporting body for the desired flow guidance according to the particular requirements.

A second plastic, which has enough flexibility to follow the relative movements permitted by the supporting body due to its shaping, is preferably used for the membrane in a targeted manner.

The proposal according to this invention yields a functional separation in which the supporting body ensures that pipe will be pressure-resistant as required, while the membrane is responsible for the desired imperviousness of the pipe.

Due to the separation of these two functions between two different bodies, the two bodies can be optimized with regard to their materials for the particular assigned function.

This functional separation also makes it possible to design the membrane with a relatively small material thickness so that less of the second plastic is required. This yields an additional cost advantage, because the second plastic required to produce the flexible membrane is usually comparatively expensive. For example, essentially the same plastic of which traditional bellows are made can be used for the membrane.

An embodiment in which the one body is molded onto the other body is especially advantageous. This yields an especially inexpensive and automated method of producing the pipe.

In an important embodiment, both bodies are designed as injection-molded parts and are produced within a single injection mold with the help of two successive injection-molding steps. The pipe is thus formed simultaneously with the second step. Since injection-molded parts can be manufactured especially inexpensively, the inventive pipe can also be manufactured advantageously in this way.

An embodiment in which the membrane of the supporting body is completely sheathed on the inside and/or outside at least in the area of a flexible longitudinal section is preferred. In this design, the membrane forms an inside sheathing and/or an outside sheathing that is supported on the supporting body and is more or less impermeable to gas and/or liquid. In this design the desired sealing of the pipe can be achieved relatively easily and relatively effectively.

Another advantage of the injection molding of the two bodies is the fact that it is thus especially easy to produce additional connections on the pipe through appropriate shaping of the supporting body and/or the membrane. Furthermore, additional gaskets may be integrally molded on the supporting body independently of the membrane, in which case the second plastic here is especially suitable so that it is possible in particular to produce the aforementioned gaskets simultaneously, i.e., in the same injection-molding step as the membrane.

Other important features and advantages of the present invention are derived from the dependent claims, the drawings and the respective description of the figures with reference to the drawings.

It is self-evident that the features mentioned above and those yet to be explained below can be used not only in the combination indicated in each case but also in other combinations or alone without going beyond the scope of the present invention.

Preferred exemplary embodiments of the present invention are illustrated in the drawings and explained in greater detail in the following description, where the same reference notation is used to refer to the same or functionally same or similar components.

The drawings show, each schematically

Figure 2:
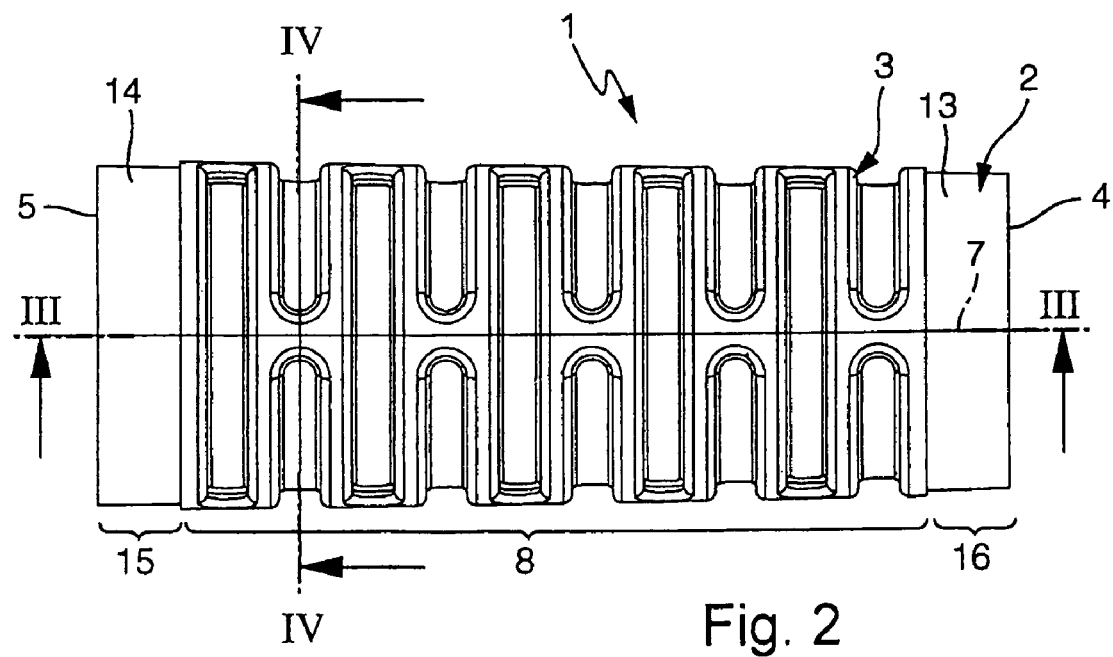
Figure 3:
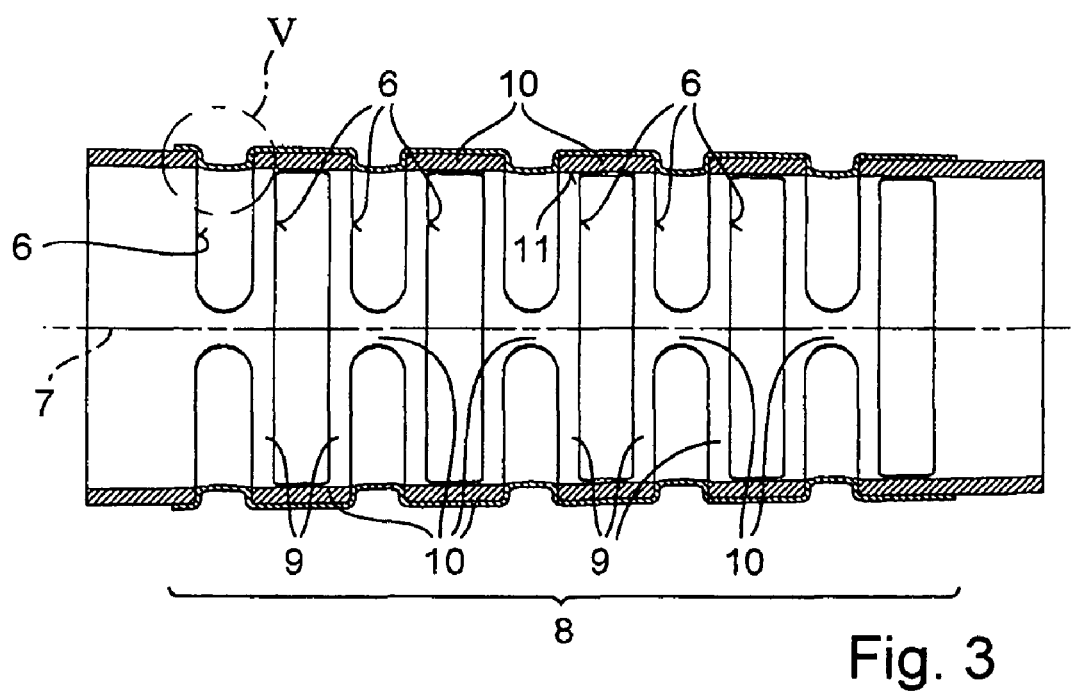
Figure 4:
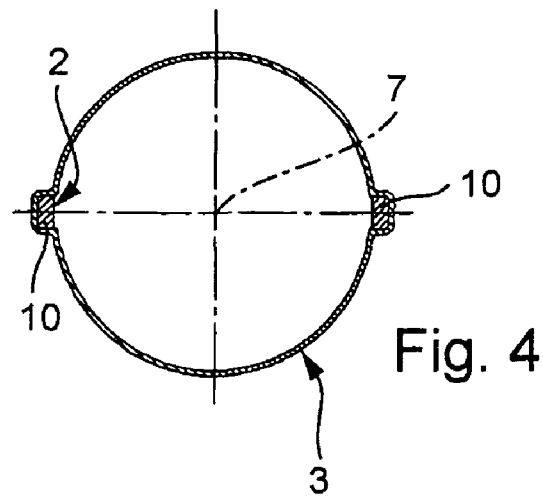
Figure 5:
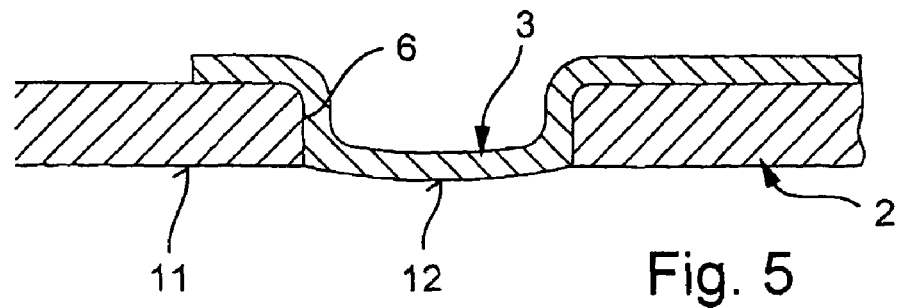
Figure 6:
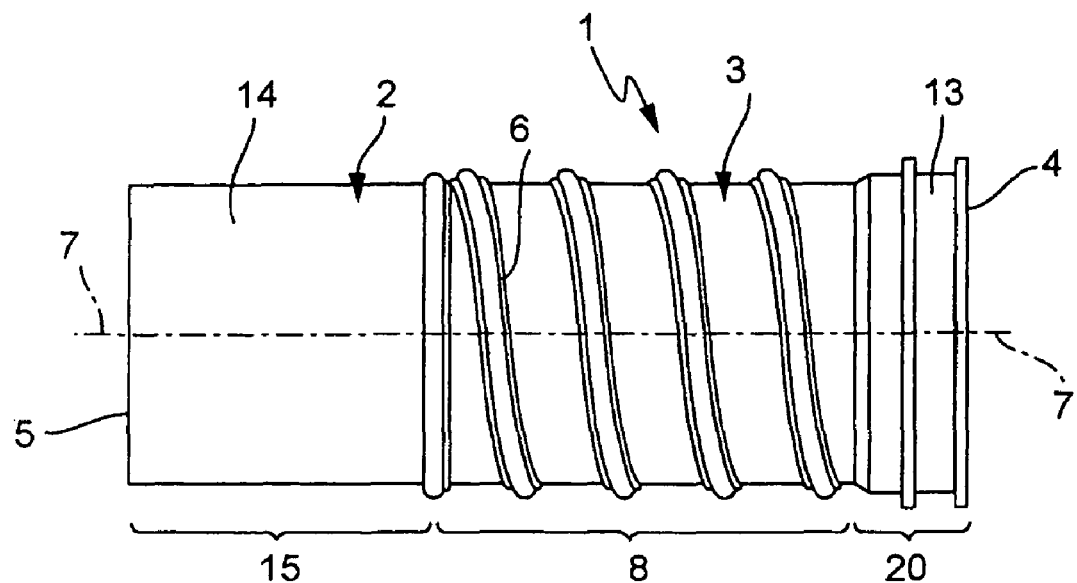
Figure 7:
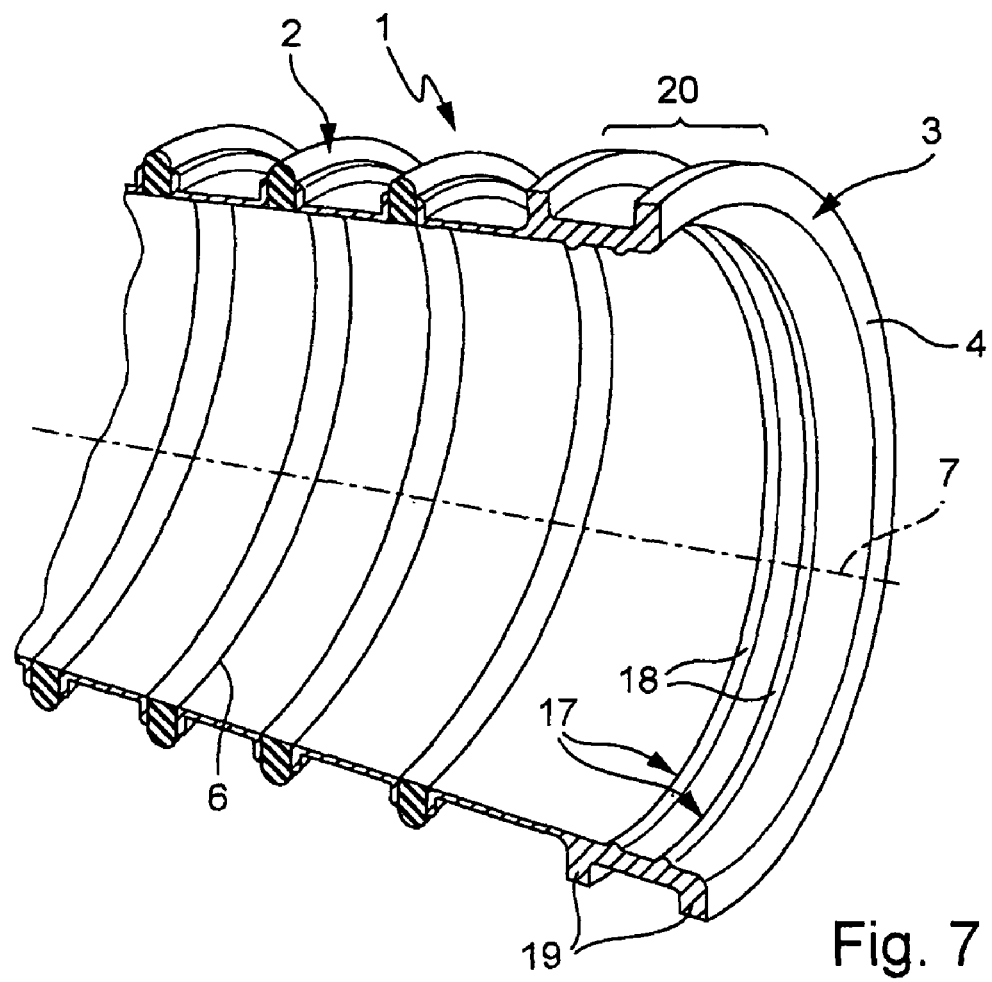

FIG. 1 a perspective view of an inventive pipe,

FIG. 2 a side view of the pipe according to FIG. 1,

FIG. 3 a longitudinal section through the pipe according to sectional lines III in FIG. 2, FIG. 4 a cross section through the pipe according to sectional lines IV in FIG. 2, FIG. 5 a detailed view of the detail V in FIG. 3, FIG. 6 a side view like that in FIG. 2 but of another embodiment, FIG. 7 a perspective view of a partial area in the longitudinal section of the pipe from FIG. 6.

According to FIGS. 1 through 3, an inventive pipe 1 has a supporting body 2 and a membrane 3. The pipe 1 is used to carry gas and may be designed to be airtight accordingly. Likewise, the pipe 1 may be designed to be fluid-tight so that it is also suitable for carrying liquids. In certain applications, the pipe 1 need not be completely airtight, so that a certain gas permeability may be desirable, e.g., to allow pressure surges to escape to the outside through the pipe wall. This can allow the pipe 1 to function as a damper with respect to airborne noise, for example. The pipe 1 has two ends 4 and 5 to which the pipe 1 can be connected at appropriate connections of components which should be interconnected with the help of the pipe 1 to convey a gas or a liquid.

The supporting body 2 is made of a first plastic which is relatively rigid. For example, the first plastic may be PP (polypropylene). According to the present invention, the supporting pipe 2 is equipped with one recess 6 or with multiple recesses 6. In the first embodiment according to FIGS. 1 through 5, the supporting body 2 is equipped with a plurality of such recesses 6, whereas in the variant according to FIGS. 6 and 7, only one such recess 6 is provided. Each recess 6 extends through the supporting body 2 across the longitudinal direction of the pipe 1. The longitudinal direction is labeled as 7 in the figures.

The arrangement, design and distribution of the recesses 6 are such that at least one longitudinal section 8 develops along the supporting body 2, indicated with curly brackets in the figure and referred to below as the flexible longitudinal section 8. In this flexible longitudinal section 8, the supporting body 2 is flexible due to the selected distribution and dimensioning of the recesses 6, i.e., the pipe 1 may be reversibly curved in the flexible longitudinal section 8 and/or may be bent with respect to an axis running across the longitudinal direction 7. In addition, the pipe 1 may also be reversibly compressed and pulled apart in its longitudinal direction 7 in the embodiments illustrated here. It is of crucial importance here that the supporting body 2, in particular also the flexible longitudinal section 8, has an essentially dimensionally stable cross section, in particular in the flexible longitudinal section 8, so the supporting body 2 can withstand compressive forces acting on the inside and/or outside of the pipe 1 when the latter is used as intended, said forces even acting in the flexible longitudinal section 8. The supporting body 2 is therefore pressure-resistant, which makes it possible to convey fluids in which an excess pressure or a vacuum prevails in relation to the environment of the pipe 1.

The wording of the preceding phrase "essentially dimensionally stable cross section" indicates that minor changes in cross section are unavoidable in the admissible bending or curving of the pipe 1. The pressure-resistant cross section retains its shape to the extent that bending or curving of the pipe 1 does not cause any significant increase in flow resistance.

In contrast with that, the membrane 3 is made of a second plastic which is relatively soft and flexible. For example, TPE (thermoplastic elastomer) may be used for the second plastic. The terms "relatively rigid" and "relatively soft and flexible" are intended in the present context to express only the fact that the first plastic is stiffer than the second plastic and/or that the second plastic is softer and more flexible than the first plastic.

The membrane 3 is mounted and/or arranged according to this invention on the supporting body 2, so that it seals and/or completely fills up the at least one recess 6 in the supporting body 2. If the second plastic is a dense plastic, the recesses are sealed by doing so. At the same time, the membrane 3 is arranged on the supporting body 2 in such a way that the membrane 3 can transmit compressive forces to the supporting body 2. As mentioned above, such compressive forces may occur on the inside and/or outside of the pipe 1 while the pipe is in use, so these forces act on the membrane 3 in the area of the at least one recess 6. The second plastic is selected so that the membrane 3 does not hinder the flexibility of the supporting body 2 in the flexible longitudinal section 8 on the one hand, while on the other hand, the membrane 3 is extensible due to the choice of materials to the extent that it can follow the movements and deformations of the supporting body 2 in the flexible longitudinal section 8 especially in the area of the at least one recess 6 without losing the desired sealing effect of the membrane 3. The connection and/or mounting of the membrane 3 on the supporting body 2 is accomplished in such a way that the desired transmission of compressive force from the membrane 3 to the supporting body 2 is made possible.

With the first embodiment illustrated in FIGS. 1 through 5, the membrane 3 is designed so that it completely encloses the supporting body 2 on the outside in the area of the flexible longitudinal section 8, i.e., sheathing on the outside of the pipe. This variant is suitable in a particular manner for applications in which a vacuum prevails in the pipe 1. The pressure difference presses the membrane 3 from the outside against the supporting body 2, which supports the sealing effect. At the same time, fastenings which may be provided between the bodies 2, 3, e.g., an adhesion connection, are not subject to loads with this arrangement. In the case of a pipe 1 in which an excess pressure prevails during operation, it is therefore expedient to arrange the membrane in the interior of the supporting body 2 in such a way that the membrane 3 henceforth completely encloses the flexible longitudinal section from the inside, i.e., sheathing on the inside of the pipe. The prevailing excess pressure then presses the membrane 3 outward against the supporting body 2.

Essentially, embodiments in which the membrane 3 is mounted on the supporting body 2 in such a way that the supporting body 2 is completely enclosed by the membrane 3 on both the inside and outside in the flexible longitudinal section 8.

The compressive forces acting on the membrane 3 can be transmitted to the supporting body 2 via a supporting surface or connecting surface, which is relatively large as a whole, so the membrane 3 may be produced with a comparatively small thickness of material. In particular, the wall thickness of the membrane 3 is approximately half as great as the wall thickness of the supporting body 2.

In the embodiment illustrated in FIGS. 1 through 5, the flexibility of the supporting section 2 in the flexible longitudinal section 8 is achieved due to the fact that the supporting body 2 which still remains due to the arrangement of the recesses 6 in the flexible longitudinal section 8 forms a skeleton which is more or less cardanically mobile, i.e., flexible or yielding. The term "cardanic" in the present case refers to the mobility created in the flexible longitudinal section, having two preferred axes of bending about which the pipe 1 can be curved or bent, whereby these two bending axes run perpendicular to one another and perpendicular to the longitudinal axis 7 of the pipe 1. In a figurative sense, this corresponds to a cardan joint having two joint axes perpendicular to one another and perpendicular to an axis of rotation.

The cardan flexibility in the flexible longitudinal section 8 is achieved in the embodiment shown here by the fact that the supporting body 2 has multiple rings in the flexible longitudinal section 8, these rings being arranged one after the other in the longitudinal direction 7 of the pipe 1 and also being aligned coaxially with the longitudinal direction 7. In addition, two neighboring rings 9 are joined together by only two webs 10. The webs 10 assigned to the same pairing of rings are diametrically opposite one another here and thereby create a spacing between the neighboring rings 9 extending in the longitudinal direction 7. This spacing of the rings creates the recesses 6.

It is also especially important for creating the desired mobility that when there are three rings 9 following one another in the longitudinal direction 7, the only two webs 10 by which the middle ring 9 is connected to the one adjacent ring 9 is arranged so it is rotated 90° about the longitudinal axis 7 in comparison with the only two webs 10 by which the respective middle ring 9 is connected to the other neighboring ring 9. The successive pairs of webs in the longitudinal direction 7 are thus each offset by 90° in relation to one another. Owing to the elasticity of the essentially rigid first plastic, each individual ring 9 allows a relatively minor elastic bending deformation, whereby a comparatively great flexible deformability can be achieved for the supporting body 2 and thus for the pipe 1 over the number of rings 9 within the flexible longitudinal section 8. In addition, the special embodiment of the supporting body 2 shown here also allows it to elastically withstand compression and stretching in parallel with the longitudinal direction 7.

A special feature of this embodiment is also seen in the fact that the supporting body 2 has a comparatively great resistance to torque loads in the flexible longitudinal section 8. This property may be advantageous for certain application forms.

As can be deduced from FIGS. 1 through 5, the membrane 3 follows the contour of the supporting body 2. In this way the desired relatively low thickness of the material can be retained over the entire extent of the membrane 3. As shown in FIGS. 3 and 5 in particular, the membrane 3 which is applied from the outside may expediently be arranged in such a way that it protrudes from the outside into the recesses 6 to such an extent that one inside 11 of the supporting body 2 seals the inside 12 of the membrane 3 in an essentially flush arrangement. This makes it possible to generate an essentially smooth inside contour in the pipe 1, which greatly reduces the flow resistance of the pipe 1. This is a serious advantage in comparison with traditional pipes designed as bellows or as corrugated tubing, for example.

As an alternative, an embodiment in which the membrane 3 consists of a plurality of partial bodies, each sealing the individual recesses 6 separately, is also possible. The manufacturing expense and complexity to achieve an adequate and permanent seal, however, is much greater than that with the one-piece or one-part design of the membrane 3 shown here.

In contrast with the variant according to FIGS. 1 through 5, the embodiment of. FIGS. 6 and 7 shows a supporting body 2 which has only a single recess 6 that extends in a spiral in the flexible longitudinal section 8. Then the remainder of the supporting body 2 remaining in the flexible longitudinal section 8 automatically also has a spiral shape. The supporting body 2 which has a spiral shape in the flexible longitudinal section 8 automatically has a three-dimensional flexibility because of its spiral shape, so this makes it possible to flexibly withstand an applied torque. The membrane 3 is again shaped and applied in such a way that it completely fills out the spiral recess 6 and seals it tightly in particular. In the present case the membrane 3 also has a spiral design, which is shown especially clearly from FIG. 7. As an alternative it is also possible to design the membrane 3 again so that it encloses or sheaths the supporting body 2, i.e., the windings of the spirals here, completely on the inside and/or outside at least within the flexible longitudinal section 8.

Although only a simple spiral is shown here for the supporting body 2 and the membrane 3, the bodies 2, 3 may also be shaped in the manner of a double spiral or multiple spiral in the flexible longitudinal section 8.

To be able to manufacture the pipe 1 as inexpensively as possible, at least one of the bodies 2, 3 is designed as an injection-molded part which is expediently molded onto the other body 2, 3. The variant in which the membrane 3 is molded onto the supporting body 2 that was manufactured previously can be implemented less expensively.

Due to the molding of the one body 2, 3 onto the other body 2, 3, form-fitting connections between the two bodies 2, 3 can be produced especially easily. In addition, an integral bond between the two bodies 2, 3 can also be produced by integral molding. For example, the subsequently molded plastic may melt on or to the surface of the previously manufactured plastic body 2, 3, forming an integral bond between the two bodies 2, 3. Such an integral bond is especially tight and strong and cannot be released nondestructively. Furthermore, it is essentially also possible to coordinate the plastics with one another so that an adhesive effect develops between the two plastics after the integral molding, also resulting in an effective fixation of the two bodies 2, 3 against one another.

A one-piece embodiment is preferred for the supporting body 2 and the membrane 3, which thereby simplifies the production and makes it less expensive.

Production of the pipe 1 takes place according to the present invention as described below.

One of the bodies 2, 3, preferably the supporting body 2, is produced by a first injection-molding step. The other body 2, 3, i.e., expediently the membrane 3, is then produced directly on the body 2, 3 produced previously in a subsequent second injection molding step. An embodiment in which there need not be a mold change is especially advantageous here. In other words, the two injection-molding steps are performed in the same injection mold, which has a variable shape that can be adjusted between the injection-molding steps.

In the embodiment depicted in FIGS. 1 through 5, the pipe 1 has an end section 13 and/or 14 on its ends 4, 5. These end sections 13, 14 here are part of the supporting body 2 which is situated outside of the flexible longitudinal section 8. The end sections 13, 14 are each formed by a section 15 and/or 16 of the supporting body 2 that is closed at the periphery. The two end sections 13, 14 of the pipe 1 may also be designed as connections with the help of which the pipe 1 can be connected to components provided for this purpose in order to join these components together in a gas-carrying and/or fluid-carrying manner through the pipe 1. These connections and/or end sections 13, 14 may then be equipped with appropriate fastening means, in particular flanges or the like. This yields a particularly high degree of integration for the supporting body 2 and/or for the pipe 1 without significantly increasing the manufacturing costs because complex shapes can easily be produced by the injection-molding process.

Between the two end sections 13, 14 designed as connections, the pipe 1 then has the flexible longitudinal section 8. In other embodiments of the pipe 1, it is essentially also possible to provide two or more such flexible longitudinal sections 8 between the end sections 13, 14 of the pipe 1, in which case then a section that is closed at the circumference is formed between flexible longitudinal sections 8 in the supporting body 2 following one another in succession in the longitudinal direction 7. In this way it is also possible to design a pipe 1 which has a relatively complex shape to also have local flexibility, thereby permitting an optimum adaptation of the pipe 1 to the particular application.

If such a connection must be provided with a gasket, then this gasket may expediently be made of the second plastic so that it is possible in particular to mold this gasket integrally together with the membrane 3 on the supporting body 3 at the particular connection. This gasket then need not have a direct physical connection to the membrane 3.

In the embodiment illustrated in FIGS. 6 and 7, the one end section 14 is again formed by a section 15 of the supporting body 2 that is closed at the circumference. In contrast with that, the other end section 13 in this embodiment is designed on the membrane 3, so that a section 20 of the pipe 1 that is closed at the circumference according to FIGS. 6 and 7 is a part of the membrane 3. Such an embodiment may also be advantageous, e.g., when the pipe 1 must be attached to an essentially rigid connection at this end section 13. For example, a gasket arrangement 17 comprised of two ring-shaped radial gaskets 18 may be integrally molded on the inside of the membrane 3 in this end section 13. In addition, for example, two peripheral collars 19 may be molded on this end section 13 so that, for example, a hose clamp can be positioned in or between these collars with the help of this hose clamp, the particular end section 13 may be secured, e.g., on a connection. In this way, additional components, e.g., the collar 19 and the gaskets 18 may be integrally formed and/or shaped on the membrane 3.

In addition, it is fundamentally also possible to provide at least one additional connection at the side on the supporting body 2 at a suitable location, in particular at a distance from the flexible longitudinal section 8 in the longitudinal direction 8. For example, fresh air for the interior of the vehicle may be branched off through such a connection or branch in the case of pipe 1 which is used in an intake tract of an internal combustion engine. If such a lateral connection is also to be provided with gasket, then this gasket may expediently again be produced with the help of the second plastic, in which case this is implemented simultaneously with the molding of the membrane 3 in particular.

The inventive pipe 1 is suitable especially for use with an internal combustion engine installed in a motor vehicle. The pipe 1 may be used there to convey fresh air so that the pipe 1 is situated in the intake tract of the internal combustion engine. The pipe 1 is then a suction pipe. The flexibility of the pipe 1 in the flexible longitudinal section 8 allows relative movements between the components of the intake tract that are interconnected via the pipe 1. The vibrations, oscillations and impacts occurring during operation of the vehicle can be accommodated in a flexible manner by the pipe 1. To this extend, the pipe 1 also allows separation of structure-borne sound. Furthermore, the inventive pipe 1 can be manufactured especially inexpensively because only a small amount of the second plastic is needed. The second plastic is comparatively experience because it is usually designed to be a lifetime part and must have a permanent resistance to fuel, oil and temperatures due to the rough ambient conditions prevailing in the engine space and at the same time it must also ensure that it will retain its flexural elasticity and flexibility for a long lifetime. Furthermore, the inventive pipe 1 can reliably support the vacuums occurring in the intake tract during operation of the internal combustion engine.

If the pipe 1 is to be airtight and/or fluid-tight, the second plastic for the membrane 3 will be selected accordingly. A tight pipe 1 is required, for example, on the clean side of the intake tract. If a high-quality imperviousness is not required, the membrane 3 may also be designed to be more or less gas-permeable. For example, use of a corresponding gas-permeable second plastic and/or a corresponding perforation in the membrane 3 is also suitable for this purpose. A gas-permeable pipe 1 may be used on the raw side of the intake tract, for example. The gas permeability allows pressure surges to pass through the pipe wall in particular, thereby making it possible to dampen airborne sound. For example, the pipe 1 may be surrounded with a layer of foam on the outside.

The invention claimed is:

1. A pipe for carrying gas and/or fluid,
having a supporting body (2) which consists of a relatively rigid first plastic and has one recess (6) or multiple recesses (6) which pass through the supporting body (2) across the longitudinal direction (7) and are arranged so that the supporting body (2) is flexible in a longitudinal section (8) that is provided with the recess (6) or the recesses (6) and withstands compressive forces acting on the inside and/or outside of the pipe (1) during use of said pipe,
having a membrane (3) consisting of a relatively soft flexible second plastic arranged on the supporting body (2) so that it seals the recess (6) or recesses (6) and transmits the compressive forces acting on the membrane (3) during use of the pipe (1) to the supporting body (2),
the membrane (3) is integrally molded on the supporting body (2) or vice versa, wherein,
the membrane (3) sheaths the supporting body (2) completely on the inside and/or outside at least in the area of the flexible longitudinal section,
the pipe (1) has two end sections (13, 14) designed as connections, each section being formed by a section (15, 16) of the supporting body (2) that is closed on the circumference, with at least one flexible longitudinal section (8) of the supporting body (2) being arranged between them;
wherein the recesses (6) are arranged in the flexible longitudinal section (8) of the supporting body (2) so that the supporting body (2) remaining in the flexible longitudinal section (8) has rings (9) arranged coaxially with the longitudinal direction (7) of the pipe (1) and side-by-side in the longitudinal direction,
adjacent rings (9) are joined together by only two webs (10) that are diametrically opposed,
with each ring (9) that is arranged between two neighboring rings (9), the only two webs (10) that are connected to the one neighboring ring (9) are arranged so they are offset by 90° with respect to the only two webs (10) connected to the other neighboring ring (9).

2. The pipe according to claim 1,
wherein the membrane (3) is joined to the supporting body (2) in a form-fitting and/or integrally bonded manner.

3. The pipe according to claim 1, wherein
the supporting body (2) is an injection-molded part produced in one step, and/or
the membrane (3) is an injection-molded part produced in one step.

4. The pipe according to claim 1,
wherein the recesses (6) are distributed along the pipe (1) in such a way that the supporting body (2) has two or more flexible longitudinal sections (8), between which the supporting body (2) has a section that is closed on the circumference.

5. The pipe according to claim 1,
wherein a gasket (17) made of the second plastic is mounted on at least one of the end sections (15, 16) made from the first plastic.

6. The pipe according to claim 1,
wherein at least one gasket (18) is integrally molded on the membrane (3).

7. The pipe according to claim 1,
wherein at least one connection on the end or side is integrally molded on the supporting body (2), said connection having a gasket made of the second plastic.

8. The pipe according to claim 1, wherein
the membrane (3) is designed in one piece, and
the supporting body (2) is designed in one piece.

9. The pipe according to claim 1,
wherein the pipe (1) is a suction pipe situated in the intake tract of an internal combustion engine.

10. The pipe according to claim 1,
wherein the recesses (6) are arranged in the flexible longitudinal section (8) of the supporting body (2), so that the supporting body (2) which remains in the flexible longitudinal section (8) forms a cardanically flexible skeleton.

11. The pipe according to claim 1, wherein
the membrane (3) is designed to be gas-permeable, or
the membrane (3) is designed to be airtight and tightly seals the recess (6) or recesses (6).

12. A pipe for carrying gas and/or fluid,
having a supporting body (2) which consists of a relatively rigid first plastic and has one recess (6) or multiple recesses (6) which pass through the supporting body (2) across the longitudinal direction (7) and are arranged so that the supporting body (2) is flexible in a longitudinal section (8) that is provided with the recess (6) or the recesses (6) and withstands compressive forces acting on the inside and/or outside of the pipe (1) during use of said pipe,
having a membrane (3) consisting of a relatively soft flexible second plastic arranged on the supporting body (2) so that it seals the recess (6) or recesses (6) and transmits the compressive forces acting on the membrane (3) during use of the pipe (1) to the supporting body (2),
the membrane (3) is integrally molded on the supporting body (2) or vice versa, wherein,
the membrane (3) sheaths the supporting body (2) completely on the inside and/or outside at least in the area of the flexible longitudinal section,
the pipe (1) has two end sections (13, 14) designed as connections, each section being formed by a section (15, 16) of the supporting body (2) that is closed on the circumference, with at least one flexible longitudinal section (8) of the supporting body (2) being arranged between them;
wherein the recesses (6) are arranged in the flexible longitudinal section (8) of the supporting body (2) so that the supporting body (2) remaining in the flexible longitudinal section (8) has rings (9) arranged coaxially with the longitudinal direction (7) of the pipe (1) and side-by-side in the longitudinal direction,
adjacent rings (9) are joined together by successive pairs of two webs (10) that are diametrically opposed,
with each ring (9) that is arranged between two neighboring rings (9), the successive pairs of two webs (10) that are connected to the one neighboring ring (9) are arranged so they are offset by 90° with respect to the successive pairs of two webs (10) connected to the other neighboring ring (9).

* * * * *